Feb. 15, 1938.　　　A. H. MacDONALD　　　2,108,073

COLOR FILM PACK

Original Filed Sept. 28, 1933

INVENTOR.
Archibald H. MacDonald.
BY
Dike, Calver & Gray
ATTORNEYS.

Patented Feb. 15, 1938

2,108,073

UNITED STATES PATENT OFFICE 2,108,073

COLOR FILM PACK

Archibald H. MacDonald, Detroit, Mich., assignor to The Coloray Corporation, Detroit, Mich., a corporation of Michigan Application September 28, 1933, Serial No. 691,331
Renewed February 12, 1937

6 Claims. (Cl. 95—2)

My invention relates to improvements in color photography and particularly to multiple film packs adapted for use in color photography and to methods for the manufacture of such film packs.

Prior to my invention systems of color photography using multiple films in a pack have been proposed. These systems have been known as the tri-pack and the bi-pack systems of color photography.

The construction of so-called tri-packs heretofore proposed was such that a transparent glass plate having a chloro-bromide silver emulsion supported thereon was placed with the glass side toward the light source. This formed the first layer of photo-sensitive material used in the pack. Adjacent the emulsion side of this plate a gelatin filter, such for example as the type known as K—1½, was placed. Then a filter having an orthochromatic emulsion was placed with its emulsion side toward the filter and formed the second layer of photo-sensitive material in the pack. A standard tri-color red (gelatin) filter was then placed adjacent the film side of the orthochromatic film, and a panchromatic emulsion supported on a glass plate was placed with its emulsion side toward the filter.

In the use of a tri-pack typical of the prior art as above described, it was found that it was impossible to record images in natural colors which would have the requisite critical sharpness in all negatives from which the color prints were to be taken. This was due largely to the fact that the material through which the light images were transmitted to the various photosensitive emulsions was relatively thick and resulted in a distortion of the transmitted image. Where attempts have heretofore been made to use three films in the pack in order to achieve the requisite thinness of the pack to preserve the critical sharpness of the image, it was found that the films would not lie flat enough to the surface to produce images with the desired amount of critical sharpness. It was found that this was particularly true in the case of the blue print which constitutes the "drawing" or outline of the finished print.

The practice of the prior art required the assembly of the color film pack just prior to its exposure. In the assembly of the packs typical of the prior art it has been found that an electro-chemical change occurs in the photo-sensitive emulsions probably due to a change of static electricity generated by the friction created during the assembly of the pack, as well as the friction due to the insertion of the pack in the camera. This electro-chemical change impaired the sensitivity of the emulsion even though the pack had been assembled immediately prior to its use. As a consequence the time of exposure could never be accurately predetermined, and as a consequence the results were very uncertain.

If for example, the electro-chemical change had occurred primarily in the orthochromatic emulsion, it was common that the orthochromatic emulsion would be under-exposed, while the other emulsions in the pack might be over-exposed, This uncertainty of results from the use of such packs was greatly increased if the pack had been assembled for any considerable period of time prior to its exposure. It also has been found that in such packs the sensitivity of the photo-sensitive material is so impaired as to prevent the full utilization of the "latent images" which otherwise may be employed to transmit the light through the pack. For this reason the films of the prior art required longer exposures to the light than would have been required had the packs been so constituted as to preserve the sensitivity of the component light-sensitive material.

I have found that a minimum distortion of the critical sharpness of the image produced in color photography by a tri-pack system may be attained by the use of very thin filters and commercial type films used in the assembly of the pack. Further, that such distortion as may result in the pack may be compensated for by using in the pack transparent substances having differing light refractive characteristics to build up in the pack an effect similar to the known phenomenon of double refraction of the light image. These transparent substances, when placed in a filter pack in accordance with my present invention, tend to correct the distortion in the image as the light passes through the various substances employed. I also have found that it is possible to so manufacture a tri-pack as to eliminate the electro-chemical changes due to static electricity generated during the assembly of the pack or the insertions of the pack in the camera.

It is, therefore, an object of my present invention to provide a system of color photography in which a color film pack is utilized which is characterized by the thinness of the pack and of its component parts.

It is a further object of my present invention to provide a film pack for use in color photography in which electro-chemical changes in the emulsion are eliminated during the assembly of the pack or the use of the pack in the camera.

It is a further object of my present invention to provide a system of color photography in which there may be an accurate predetermination of exposure time due to the maintenance of the sensitivity of the film pack at all times.

It is a further object of my present invention to provide a system of color photography in which the image is recorded with the minimum amount of distortion of its critical sharpness.

It is a further object of my present invention to provide a system of color photography in which relatively short exposures are utilized and in which the "latent image" effect is fully utilized.

It is a further object of my present invention to provide a film pack for use in color photography in which a commercial type of flexible film may be used as the support for the light-sensitive emulsions and yet be maintained with the requisite flatness to produce images characterized by a high degree of critical sharpness.

It is a further object of my present invention to provide a film pack impervious to moisture for use in systems of color photography.

It is a further object of my present invention to provide a film pack for use in systems of color photography which is sensitive to a wide range of rays of the spectrum including the ultra-violet rays.

These and various other objects, features of arrangement, construction and operation, are plainly shown and described and will be best understood by reference to the accompanying drawing, in which.

Similar reference numerals refer to similar parts throughout the several views.

Figure 1:
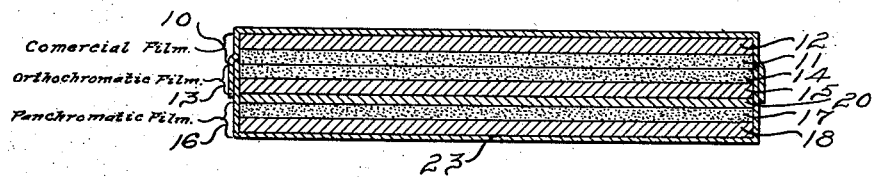
Fig. 1 is a cross-sectional view of a film pack embodying my invention, utilizing three separate light-sensitive substances adapted for use with artificial light.

Referring in detail to my drawing, particularly to Fig. 1, 10 designates a commercial transparent film utilizing a silver halide emulsion; 11 designates the emulsion side of the commercial film 10; 12 designates the celluloid support for the emulsion in the commercial film 10; 13 designates an orthochromatic film; 14 designates the emulsion used on the orthochromatic film; 15 designates the support for the orthochromatic film emulsion; 16 designates the panchromatic film; 17 designates the emulsion of the panchromatic film; 18 designates the support for the emulsion of the panchromatic film; 20 designates a filter which is adapted to pass the red rays but screen out the yellow and blue rays, and is preferably formed of transparent cellulose tissue.

Figure 2:
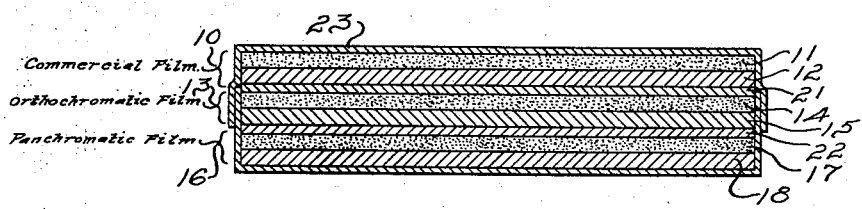
Fig. 2 is a cross-sectional view of a film pack embodying my invention having three light-sensitive substances and adapted for use in daylight.
Figure 3:
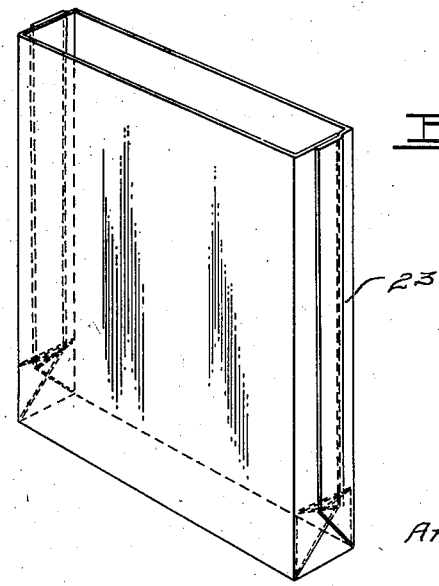
Fig. 3 is a view in perspective of a container formed of a transparent cellulose tissue for a film pack embodying my invention.

Referring to Fig. 2, 21 designates a filter formed of transparent cellulose tissue which is adapted to pass the red and blue rays but screen out the yellow rays; 22 designates a filter formed of cellulose tissue which is adapted to pass the red rays but screen out the yellow and blue rays; 23 designates the covering for the film pack embodying my invention which is shown in perspective in Fig. 3, this cover being formed of a thin, transparent cellulose, tissue.

In describing my invention in detail, and as illustrated in the figures of the drawing hereto, I have referred to its use in connection with a system of color photography utilizing the tri-pack system, i. e., packs of films having light-sensitive films adapted to record separately the primary colors red, yellow, and blue, and the use in such packs of appropriate filters to insure the transmission of the proper rays to the proper light-sensitive film. My invention, however, is not limited to such use but may be used with equal advantage in bi-pack systems of color photography, i. e., where packs of films having two light-sensitive emulsions are employed to record the colors of the object. In some of its aspects, my invention may also be employed advantageously in connection with the conventional black and white work in which film packs are used.

For three color work three separate negative films may be employed to produce the proper interpretation of the image in terms of the three pure, primary colors, red, yellow and blue. The three films preferably used in this system are (1) the ordinary commercial film 10, (2) the orthochromatic film 13, and (3) the panchromatic film 16.

Following the subtractive process, each of these films is prepared so as to be sensitive to light rays of appropriately selected wave lengths of the spectrum. For example, the ordinary film is preferably light sensitized so that it will record the blue and red light rays. It is, therefore, opaque to these rays and transparent to the yellow rays. The orthochromatic film is preferably light sensitized so that it will record the blue and yellow (green) rays. It is, therefore, opaque to these rays and transparent to red rays. The panchromatic film is preferably light sensitized so that it will be sensitive to and will record all rays of the spectrum. Consequently, a red and yellow filter is introduced in advance of the panchromatic film, which passes only the red and yellow rays to the film, screening out the blue rays.

I propose to utilize as the color filters 20, 21, or 22, a thin sheet of transparent cellulose tissue which is colored in the requisite manner to pass only certain rays of the spectrum and to screen out other rays of the spectrum. These color filters may be colored with appropriate dyes or otherwise treated to effect the desired coloration of the filter.

The thickness of filters utilizing cellulose tissues is preferably between nine and seventeen ten thousandths of an inch. The standard gelatin filters utilized in the prior art are about one two hundred fiftieth of an inch in thickness. It is apparent, therefore, that the use of such filters gives a thinness to the assembled color pack never before attained.

The base for the emulsions to be employed in carrying out my invention may be celluloid having a thickness of approximately five one thousandths of an inch, although it is preferred to utilize ordinary and orthochromatic films in which the combined thickness of the base and emulsion coating or layer of each film does not exceed about five one thousandths of an inch.

The orthochromatic and panchromatic emulsions which are used in the assembly of a film pack embodying my invention may be light sensitized and dyed in any conventional manner.

Thus, the three color and two color film packs may be produced and used successfully in the following manner. The tri-pack comprises, in their order taken from the light source, an ordinary (undyed) commercial film having a silver halide emulsion, an orthochromatic film, and a panchromatic film. The ordinary film and the orthochromatic film are arranged with their emulsion sides adjacent each other. A red filter of the type heretofore described is interposed between the orthochromatic and panchromatic films, and if desired a yellow filter may be placed between the commercial and orthochromatic films. The pack thus formed is then entirely enclosed within a tight fitting wrapper composed of waterproof transparent dielectric material such as cellulose tissue 23. This tissue is preferably of the precipitated viscose type, which is processed so as to render it impervious to water. Waterproof "cellophane" or similar tissue may be used, and the wrapper for the pack preferably has all joints cemented so that no moisture can enter the interior of the pack. This wrapper not only has the advantage of being entirely weather proof but it also serves to eliminate static. Moreover, the packs may be prepared in advance of use, may be stored for periods of from one to two years, may be readily handled, and may be used with film holders in standard cameras. After exposure the wrapper is removed and the separate negatives developed in the usual manner. For two color work a bi-pack is prepared and wrapped in the same way, using preferably an orthochromatic and panchromatic film with a suitable filter, such as an orange filter between the films.

The transparent cellulose tissue herein utilized either for the wrapper 23 or the color filters 20, 21, or 22, may be produced in accordance with various methods. For example, a cellulose xanthate may be prepared from an alkali cellulose, after aging, by adding carbon bisulfide in sufficient quantities to form the xanthate. Cellulose xanthate readily forms colloidal solutions in dilute sodium hydroxide. The freshly prepared xanthate is mixed with dilute sodium hydroxide until a uniform colloidal solution known as a viscose is formed. Before the viscose can be successfully coagulated and regenerated it ordinarily must be "ripened". After filtration and removal of air the viscose is extruded in a uniform sheet between the lips of non-corroding metal and into a coagulating bath, containing sulphuric acid and salts, where the cellulose xanthate solution is regenerated into a cellulose film. Finishing processes include washing, disulphuring and bleaching. For color filter purposes the tissue may be dyed or otherwise treated. For the film pack wrapper the tissue is transparent to all rays of light and is moisture proofed.

It is essential that there is a careful correlation of the speeds of the component emulsions used in a pack embodying my invention, i. e., the relative speeds of the various layers of film must be such that a single exposure produces uniform exposure of all negatives in the pack. I have found for example, that a satisfactory pack for general use in color photography will result by using an ordinary or commercial type film having a speed of approximately 200 H & D, an orthochromatic film having a speed of approximately 350 H & D, and a panchromatic film having a speed of approximately 750 H & D. In this embodiment of my invention the ordinary or commercial film is undyed, while the orthochromatic film is preferably dyed with erythrosin, while the panchromatic film is dyed with orthochrom T, or sensitol green and sensitol violet.

For the purpose of describing my invention I have employed certain phraseology or terminology solely for the purpose of description and not for limitation, and it is not intended to limit the present invention claimed herein beyond the requirements of the prior art.

While I have illustrated a preferred embodiment of my invention many modifications may be made without departing from the spirit of the invention, and I do not wish to be limited to the precise details set forth, but desire to avail myself of all changes within the scope of the appended claims.

I claim:

1. A film pack for use in color photography comprising a commercial type film, an orthochromatic film, and a panchromatic film, a color filter formed of thin cellulose tissue interposed between said orthochromatic film and said panchromatic film, the said films and the said filter being fully enclosed in a covering formed of a thin, transparent cellulose tissue.

2. A film pack for use in color photography comprising a commercial type film, an orthochromatic film, and a panchromatic film, a transparent color filter interposed between said commercial type film and said orthochromatic film, and a second transparent color filter interposed between said orthochromatic film and said panchromatic film, the said films and said color filters being fully enclosed in a sealed covering formed of a transparent dielectric material.

3. A film pack for use in color photography comprising a commercial type film having a speed of approximately 200 H & D, an orthochromatic film having a speed of approximately 350 H & D, and a panchromatic film having a speed of approximately 750 H & D, a transparent color filter interposed between said orthochromatic and said panchromatic films, and a covering formed of a transparent dielectric material fully enclosing the said films and said filter.

4. A film pack comprising a commercial type film having a speed of approximately 200 H & D, an orthochromatic film having a speed of approximately 350 H & D, a panchromatic film having a speed of approximately 750 H & D, a transparent color filter interposed between said commercial and said orthochromatic films, a transparent color filter interposed between said orthochromatic and panchromatic films, and a covering of a transparent dielectric material fully enclosing the said films and said filters.

5. A negative film pack for use in color photography, comprising a commercial type negative film, an orthochromatic negative film, and a panchromatic negative film, and a color filter interposed between said orthochromatic film and said panchromatic film, the said pack being fully enclosed in a covering formed of a thin transparent tissue.

6. A negative film pack comprising a plurality of separate negative films adapted to record upon a single exposure thereof the primary colors present in an object being photographed, and a protective covering therefor comprising a wrapper formed of a thin transparent tissue completely surrounding and enclosing said pack.

ARCHIBALD H. MacDONALD.